United States Patent
Tsutsumi

(10) Patent No.: US 9,752,487 B2
(45) Date of Patent: Sep. 5, 2017

(54) FAILURE DETECTION DEVICE FOR FUEL ADDITION VALVE

(71) Applicant: HINO MOTORS, LTD., Hino-shi (JP)

(72) Inventor: Munechika Tsutsumi, Tokyo (JP)

(73) Assignee: HINO MOTORS, LTD., Hino-shi (JP)

(*) Notice: Subject to any disclaimer, the term of this patent is extended or adjusted under 35 U.S.C. 154(b) by 30 days.

(21) Appl. No.: 14/784,209

(22) PCT Filed: Jul. 8, 2014

(86) PCT No.: PCT/JP2014/068177
§ 371 (c)(1),
(2) Date: Oct. 13, 2015

(87) PCT Pub. No.: WO2015/005335
PCT Pub. Date: Jan. 15, 2015

(65) Prior Publication Data
US 2016/0053655 A1    Feb. 25, 2016

(30) Foreign Application Priority Data

Jul. 10, 2013 (JP) ................... 2013-144153

(51) Int. Cl.
*F01N 11/00* (2006.01)
*F01N 3/36* (2006.01)
(Continued)

(52) U.S. Cl.
CPC ............ *F01N 11/00* (2013.01); *F01N 3/0253* (2013.01); *F01N 3/36* (2013.01); *F01N 9/002* (2013.01);
(Continued)

(58) Field of Classification Search
CPC ............... F01N 2550/05; F01N 11/00; F01N 2900/1808; F01N 2610/02; F01N 3/208;
(Continued)

(56) References Cited

U.S. PATENT DOCUMENTS 7,743,603 B2 * 6/2010 Nishina .................. B01D 53/90
                                                            60/286
8,132,405 B2 * 3/2012 Katou ................ B01D 53/9409
                                                            60/295
(Continued)

FOREIGN PATENT DOCUMENTS

JP    2003-193824 A    7/2003
JP    2008-2425 A      1/2008
(Continued)

OTHER PUBLICATIONS

International Search Report issued Oct. 7, 2014 in PCT/JP2014/068177 filed Jul. 8, 2014.

*Primary Examiner* — Freddie Kirkland, III
(74) *Attorney, Agent, or Firm* — Oblon, McClelland, Maier & Neustadt, L.L.P.

(57) ABSTRACT

A controller recognizes that fuel is and is not actually injected when an amplitude of fuel pressure fluctuations detected by a pressure sensor is not less than and is less than a pressure threshold α, respectively, to obtain a number N of actual fuel injections and determines that a fuel addition valve operates normally and has malfunction when a ratio (N/S) of the obtained numbers N of the actual fuel injections to a number S of the fuel injection commands is not less than and is less than a number ratio threshold β, respectively.

3 Claims, 2 Drawing Sheets

(51) Int. Cl.
*F01N 3/025* (2006.01)
*F01N 9/00* (2006.01)

(52) U.S. Cl.
CPC ...... *F01N 2550/04* (2013.01); *F01N 2550/05* (2013.01); *F01N 2610/03* (2013.01); *F01N 2900/1808* (2013.01); *Y02T 10/47* (2013.01)

(58) Field of Classification Search
CPC ...... F01N 2550/04; F01N 3/0253; F01N 3/36; F01N 9/002; Y02T 10/47
See application file for complete search history.

(56) References Cited

U.S. PATENT DOCUMENTS

| | | | |
|---|---|---|---|
| 8,161,808 B2* | 4/2012 | Crawford | F01N 3/208 73/114.75 |
| 8,276,437 B2* | 10/2012 | Kitazawa | F01N 3/206 60/295 |
| 8,387,366 B2* | 3/2013 | Ohno | F01N 3/2066 60/274 |
| 8,522,530 B2* | 9/2013 | Igarashi | F01N 3/208 60/277 |
| 9,145,808 B2* | 9/2015 | Yokota | F01N 3/208 |
| 9,145,817 B2* | 9/2015 | Ohno | F01N 3/0842 |
| 9,399,942 B2* | 7/2016 | Sun | F01N 11/002 |
| 9,458,754 B2* | 10/2016 | Everard | F01N 3/208 |
| 2008/0282681 A1* | 11/2008 | Katou | B01D 53/9409 60/286 |
| 2010/0005871 A1* | 1/2010 | Kitazawa | F01N 3/206 73/114.69 |
| 2010/0212417 A1* | 8/2010 | Crawford | F01N 3/208 73/114.76 |
| 2011/0099983 A1* | 5/2011 | Ohno | F01N 3/2066 60/277 |

FOREIGN PATENT DOCUMENTS

| | | |
|---|---|---|
| JP | 2008-180193 A | 8/2008 |
| JP | 2011-117440 A | 6/2011 |
| JP | 2011-149366 A | 8/2011 |
| JP | 2013-113202 A | 6/2013 |

* cited by examiner

FAILURE DETECTION DEVICE FOR FUEL ADDITION VALVE

TECHNICAL FIELD

The present invention relates to a device for detecting failure of a fuel addition valve.

BACKGROUND ART

Generally, particulates (particulate matter) contained in exhaust gas from a diesel engine are mainly constituted by carbonic soot and a soluble organic fraction (SOF) of high-boiling hydrocarbon and contain a trace of sulfate (misty sulfuric acid fraction). The particulates are captured by a particulate filter incorporated in an exhaust pipe through which exhaust gas flows.

The particulate filter has a porous honeycomb structure made of ceramics such as cordierite and having lattice-like compartmentalized passages; alternate ones of the passages have plugged inlets and the remaining passages with unplugged open inlets have plugged outlets.

Only the exhaust gas passing through thin porous walls compartmentalizing the respective passages is discharged downstream.

The particulates in the exhaust gas, which are captured and accumulated on inner surfaces of the thin porous walls, require to be burned off for regeneration of the particulate filter before exhaust resistance increases due to clogging. However, the exhaust from the diesel engine in a normal operation status rarely has a chance to reach a temperature level at which the particulates ignite by themselves.

In order to overcome this, an oxidation catalyst comprising, for example, alumina carrying platinum and added with rare earth element such as cerium is integrally carried by a particulate filter. The oxidation catalyst facilitates an oxidation reaction of particulates captured by the particulate filter to lower the ignition temperature, so that the particulates can be burned off even at an exhaust temperature level lower than ever before.

However, even in such a case, a captured amount of the particulates may exceed a treated amount in an operation area having a lower exhaust temperature level. Continued operation at such lower exhaust temperature level may hinder sufficient regeneration of the particulate filter, resulting in excessive accumulation of the captured particulates in the particulate filter. Thus, when an amount of accumulated particulates has increased, it is necessary to forcibly heat the particulate filter to burn off the captured particulates.

More specifically, it has been conceived that a flow-through type oxidation catalyst is arranged in front of the particulate filter and a fuel addition valve is incorporated in the exhaust pipe upstream of the oxidation catalyst and that fuel added by the fuel addition valve is caused to make oxidization reaction through the oxidation catalyst and the exhaust gas elevated in temperature by resultant reaction heat is guided to the particulate filter to increase a catalyst bed temperature to thereby burn off the particulates, resulting in regeneration of the particulate filter.

There exists, for example, Patent Literature 1 showing general state of the art pertinent to this kind of forced regeneration of a particulate filter.

CITATION LIST

Patent Literature

Patent Literature 1: JP 2003-193824A

SUMMARY OF INVENTION

Technical Problems

Recently obliged in countries is equipment of a so-called on-board diagnosis device (OBD) to a vehicle to monitor any failure in an exhaust gas countermeasure system; upon failure occurrence, it turns on a warning light, makes a warning beep or the like for announcement of the failure occurrence to a driver and records details of the failure.

However, it is hard in an existing on-board diagnosis device to detect any unexpected failure in fuel addition for regeneration of a particulate filter due to, for example, caught foreign matters in moving parts of a fuel addition valve and resultant seizure of the valve being closed. Thus, it has been desired to enable diagnosis on malfunction of the fuel addition valve.

The invention was made in view of the above and has its object to provide a device for detecting failure of a fuel addition valve which can detect malfunction of the fuel addition valve and can steadily perform fuel addition for regeneration of a particulate filter.

Solution to Problems

The invention is directed to a device for detecting failure of a fuel addition valve which injects fuel from a fuel pump through a fuel addition pipe to exhaust gas flowing through an exhaust pipe comprising a pressure sensor incorporated in said fuel addition pipe for detecting fuel pressure fluctuations upon injection of the fuel by said fuel addition valve and a controller for recognizing that the fuel is actually injected when an amplitude of the fuel pressure fluctuations detected by said pressure sensor is not less than a pressure threshold and that the fuel is not actually injected when the amplitude of the fuel pressure fluctuations detected by said pressure sensor is less than the pressure threshold to thereby obtain a number of actual fuel injections and for determining that said fuel addition valve operates normally when a ratio of said number of the actual fuel injections to a number of fuel injection commands is not less than a number ratio threshold and that said fuel addition valve has malfunction when the ratio of said number of the actual fuel injections to the number of the fuel injection commands is less than the number ratio threshold.

In the device for detecting failure of the fuel addition valve, it is effective for prevention of false detection to set that $$0<\beta<1$$

where $\beta$ is said number ratio threshold.

Advantageous Effects of Invention

A device for detecting failure of a fuel addition valve according to the invention can exhibit excellent effects that malfunction of the fuel addition valve can be detected and fuel can be steadily added for regeneration of a particulate filter.

DESCRIPTION OF EMBODIMENT

Next, an embodiment of the invention will be described in conjunction with attached drawings.

Figure 1:
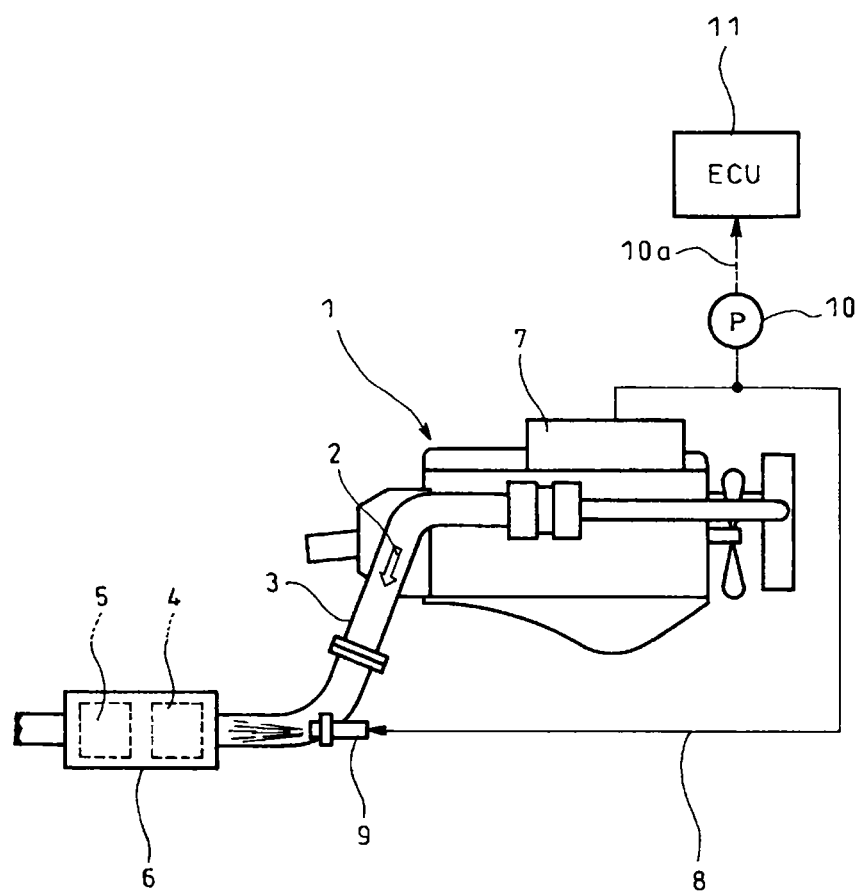
FIG. 1 is an overall schematic diagram showing an embodiment of a device for detecting failure of a fuel addition valve according to the invention.
Figure 2:
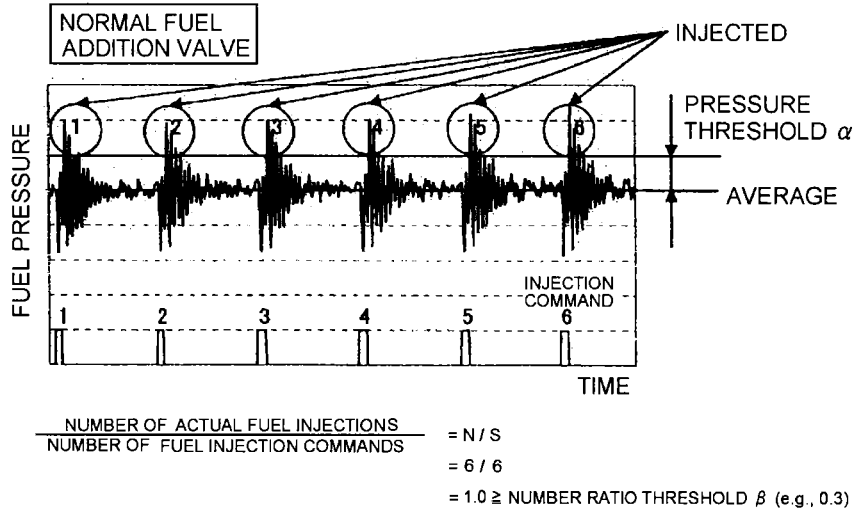
FIG. 2 is a diagram showing amplitudes of fuel pressure fluctuations during a fuel addition valve normally operating in response to fuel injection commands in the embodiment of the device for detecting failure of the fuel addition valve according to the invention.
Figure 3:
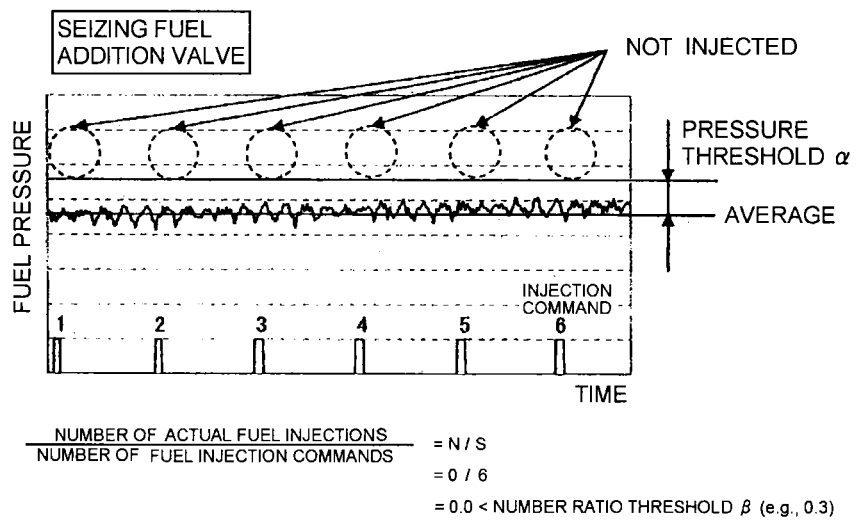
FIG. 3 is a diagram showing the amplitudes of the fuel pressure fluctuations during malfunction of the fuel addition valve against the fuel injection commands in the embodiment of the device for detecting failure of the fuel addition valve according to the invention.

FIGS. 1-3 show an embodiment of a device for detecting failure of a fuel addition valve according to the invention in which exhaust gas 2 from an engine 1 is discharged through an exhaust pipe 3 to outside of a vehicle. Incorporated in the exhaust pipe 3 is a particulate filter 5 with an oxidation catalyst 4 preceding the same and encased by a filter case 6.

The engine 1 is provided with a fuel pump 7 which in turn is connected through a fuel addition pipe 8 to a fuel addition valve 9. The fuel addition valve 9 is mounted on the exhaust pipe 3 to inject fuel into the exhaust pipe 3 upstream of the filter case 6. When an amount of particulates accumulated in the particulate filter 5 has increased, fuel is injected into an exhaust pipe 3 upstream of the filter case 6 to perform regeneration of the particulate filter 5.

In the embodiment, incorporated in the fuel addition pipe 8 is a pressure sensor 10 which detects fuel pressure fluctuations during fuel injection by the fuel addition valve 9. A detection signal 10a from the pressure sensor 10 is inputted to a controller (ECU) 11.

As shown in FIG. 2, the controller 11 is adapted to recognize that the fuel is actually injected when an amplitude of the pressure fluctuations detected by the pressure sensor 10 is not less than a pressure threshold α to thereby obtain a number N of actual fuel injections and determine that the fuel addition valve 9 normally operates when a ratio (N/S) of the number N of the actual fuel injections to a number S of fuel injection commands is not less than a number ratio threshold β. The pressure threshold α is preliminarily set on the basis of tests conducted for each kind of the engines 1.

And, as shown in FIG. 3, the controller 11 is adapted to recognize that the fuel is not actually injected when the amplitude of the pressure fluctuations detected by the pressure sensor 10 is less than the pressure threshold α to thereby obtain the number N of the actual fuel injections and determine that the fuel addition valve 9 has malfunction such as seizure when the ratio (N/S) of the number N of the actual fuel injections to the number S of the fuel injection commands is less than the number ratio threshold β.

Fuel injection commands outputted from the controller 11 to the fuel addition valve 9 are counted to obtain the number S of the fuel injection commands.

The number ratio threshold β is ideally 1; but, it is preferable for prevention of false detection to satisfy an inequation:

$0<\beta<1$

For example, a value of 0.3 may be set.

Next, mode of operation of the above embodiment will be described.

When an amount of the particles accumulated in particulate filter 5 has increased during an operation of the engine 1, fuel injection commands to the fuel addition valve 9 are outputted from the controller 11 and a number thereof is counted to obtain the number S of the fuel injection commands.

Fuel pressure fluctuations during fuel injection by the fuel addition valve 9 are detected by the pressure sensor 10 incorporated in the fuel addition pipe 8 and detection signals 10a from the pressure sensor 10 are inputted to the controller 11.

The controller 11 recognizes that the fuel is actually injected when an amplitude of fuel pressure fluctuations detected by the pressure sensor 10 is not less than the pressure threshold α and that the fuel is not actually injected when the amplitude of fuel pressure fluctuations detected by the pressure sensor 10 is less than the pressure threshold α, thereby obtaining a number N of actual fuel injections.

As shown in FIG. 2, for example, when the number S of the fuel injection commands is 6 and all of the amplitudes of the fuel pressure fluctuations detected by the pressure sensor 10 are not less than the pressure threshold α, then the number N of the actual fuel injections is counted as 6 and a ration (N/S) of the number N of the actual fuel injections to the number S of fuel injection commands is $N/S=6/6=1.0\geq$the number ratio threshold β (e.g., 0.3)

Thus, the controller 11 determines that the fuel addition valve 9 normally operates.

The fuel added by the fuel addition valve 9 is caused to make an oxidization reaction through the oxidation catalyst 4 shown in FIG. 1 and the exhaust gas increased in temperature due to resultant reaction heat is introduced into the particulate filter 5 to increase a catalyst bed temperature. As a result, the particulates are burnt out to attain regeneration of the particulate filter 5.

On the other hand, as shown in FIG. 3, for example, when the number S of the fuel injection commands is 6 and all of the amplitudes of the fuel pressure fluctuations detected by the pressure sensor 10 are less than the pressure threshold α, then the number N of the actual fuel injections is counted as 0 and the ratio (N/S) of the number N of the actual fuel injections to the number S of the fuel injection commands is $N/S=0/6=0.0<$the number ratio threshold β (e.g., 0.3)

Thus, the controller 11 determines that the fuel addition valve 9 has malfunction.

When the number S of the fuel injection commands is 6 and the number N of the actual fuel injections is counted as 2, the ratio (N/S) of the number N of the actual fuel injections to the number S of the fuel injection commands is $N/S=2/6=0.33\geq$the number ratio threshold β (e.g., 0.3)

Thus, the controller 11 determines that the fuel addition valve 9 operates more or less normally. However, when the number N of the actual fuel injections is counted as 1, the ratio (N/S) of the number N of the actual fuel injections to the number S of the fuel injection commands is $N/S=1/6=0.17<$the number ratio threshold β (e.g., 0.3)

Thus, the controller 11 determines that the fuel addition valve 9 has malfunction.

If the number ratio threshold β were set to 1, mere reduction of the number N of the actual fuel injections by one relative to the number S of the fuel injection commands would cause the fuel addition valve 9 to be determined to have malfunction, thereby increasing a possibility of frequent false detection. However, in the embodiment, the number ratio threshold $\beta$ is set to be $$0<\beta<1,$$

which is effective for prevention of false detection.

Thus, any malfunction of the fuel addition valve 9 can be detected and the fuel can be steadily added for regeneration of the particulate filter 5.

It is to be understood that the a device for detecting failure of a fuel addition valve according to the invention is not limited to the above embodiment with a particulate filter as the aftertreatment device and that various changes and modifications may be made without departing from the scope of the invention. For example, the invention may be similarly applied to a fuel addition valve used in a case where the aftertreatment device is a selective reduction catalyst with a property capable of selectively reacting $NO_x$ with a reducing agent even in the presence of oxygen or a case where the aftertreatment device is a $NO_x$ storage-reduction catalyst with a property capable of oxidizing $NO_x$ in exhaust gas and temporarily storing the same in the form of nitrate salt when air-fuel ratio of the exhaust gas is lean and capable of decomposing and discharging $NO_x$ for reduction and purification through the interposition of unburned HC, CO and the like when a concentration of oxygen in the exhaust gas is lowered.

REFERENCE SIGNS LIST

1 engine
2 exhaust gas
3 exhaust pipe
7 fuel pump
8 fuel addition pipe
9 fuel addition valve
10 pressure sensor
11 controller
N number of actual fuel injections
S number of fuel injection commands
$\alpha$ pressure threshold
$\beta$ number ratio threshold

The invention claimed is:

1. A device for detecting failure of a fuel addition valve which injects fuel from a fuel pump through a fuel addition pipe to exhaust gas flowing through an exhaust pipe, the device comprising:
   a pressure sensor incorporated in said fuel addition pipe for detecting fuel pressure fluctuations upon injection of the fuel by said fuel addition valve; and
   a controller
      for recognizing that the fuel is actually injected when an amplitude of the fuel pressure fluctuations detected by said pressure sensor is not less than a pressure threshold and that the fuel is not actually injected when the amplitude of the fuel pressure fluctuations detected by said pressure sensor is less than the pressure threshold to thereby obtain a number of actual fuel injections, and
      for determining that said fuel addition valve operates normally when a ratio of said number of actual fuel injections to a number of fuel injection commands is not less than a number ratio threshold and that said fuel addition valve has a malfunction when the ratio of said number of actual fuel injections to the number of fuel injection commands is less than the number ratio threshold,
   wherein the controller sets the number ratio threshold to satisfy an inequation:

$$0<\beta<1$$

where $\beta$ is said number ratio threshold.

2. The device for detecting failure of the fuel addition valve as claimed in claim 1, wherein the pressure threshold is a predetermined amplitude of the fuel pressure fluctuations.

3. The device for detecting failure of the fuel addition valve as claimed in claim 1, the number of actual fuel injections is equal to a number of times the amplitude of the fuel pressure fluctuations detected by said pressure sensor is not less than the pressure threshold over a period of time in which the number of fuel injection commands are output by the controller.

* * * * *